(12) United States Patent
Rajagopalan

(10) Patent No.: US 7,574,495 B1
(45) Date of Patent: Aug. 11, 2009

(54) SYSTEM AND METHOD FOR MANAGING INTERWORKING COMMUNICATIONS PROTOCOLS

(75) Inventor: Nara Rajagopalan, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 299 days.

(21) Appl. No.: 09/663,457

(22) Filed: Sep. 13, 2000

(51) Int. Cl.
G06F 15/173 (2006.01)
G06F 15/16 (2006.01)
H04L 12/28 (2006.01)

(52) U.S. Cl. .................... 709/223; 709/249; 370/392; 370/409

(58) Field of Classification Search ................ 709/200, 709/230; 370/469, 467, 466, 465, 464, 395.52, 370/395.61, 389
See application file for complete search history.

(56) References Cited

U.S. PATENT DOCUMENTS

| | | | |
|---|---|---|---|
| 4,667,287 A | 5/1987 | Allen et al. | |
| 5,473,599 A | 12/1995 | Li et al. | |
| 5,490,252 A | 2/1996 | Macera et al. | |
| 5,550,816 A | 8/1996 | Hardwick et al. | |
| 5,581,705 A | 12/1996 | Passint et al. | |
| 5,745,778 A | 4/1998 | Alfieri | |
| 5,825,772 A | 10/1998 | Dobbins et al. | |
| 5,841,973 A | 11/1998 | Kessler et al. | |
| 5,875,290 A | 2/1999 | Bartfai et al. | |
| 5,963,555 A * | 10/1999 | Takase et al. | 370/395.52 |
| 5,964,847 A | 10/1999 | Booth et al. | |
| 6,047,330 A | 4/2000 | Stracke, Jr. | |
| 6,098,110 A | 8/2000 | Witkowski et al. | |
| 6,169,739 B1 * | 1/2001 | Isoyama | 370/395.54 |
| 6,169,793 B1 | 1/2001 | Godwin et al. | |
| 6,175,867 B1 | 1/2001 | Taghadoss | |
| 6,220,768 B1 | 4/2001 | Barroux | |
| 6,243,580 B1 | 6/2001 | Garner | |
| 6,260,072 B1 | 7/2001 | Rodriguez-Moral | |
| 6,260,073 B1 | 7/2001 | Walker et al. | |
| 6,266,695 B1 | 7/2001 | Huang et al. | |
| 6,286,038 B1 | 9/2001 | Reichmeyer et al. | |
| 6,295,297 B1 * | 9/2001 | Lee | 370/395.61 |
| 6,330,602 B1 | 12/2001 | Law et al. | |
| 6,338,092 B1 | 1/2002 | Chao et al. | |
| 6,343,083 B1 * | 1/2002 | Mendelson et al. | 370/466 |
| 6,405,262 B1 | 6/2002 | Vogel et al. | |
| 6,414,595 B1 | 7/2002 | Scrandis et al. | |
| 6,438,612 B1 * | 8/2002 | Ylonen et al. | 709/249 |
| 6,449,650 B1 | 9/2002 | Westfall et al. | |
| 6,453,406 B1 | 9/2002 | Sarnikowski et al. | |
| 6,459,682 B1 * | 10/2002 | Ellesson et al. | 370/235 |
| 6,463,061 B1 | 10/2002 | Rekhter et al. | |

(Continued)

OTHER PUBLICATIONS

Gasparro, D. M., "Next-Gen VPNs: The Design Challenge", *Data Communications*, (Sep. 1999), pp. 83-84, 86, 88, 90, 93, 95.

(Continued)

Primary Examiner—Wen-Tai Lin
(74) Attorney, Agent, or Firm—Hamilton, DeSanctis & Cha, LLP

(57) ABSTRACT

A computerized method for managing interworking protocols applies policies that aid in provisioning a first interface, having a first protocol, a transport network having a second protocol, a virtual circuit within the transport network; and a second interface, having the same protocol as the first.

42 Claims, 8 Drawing Sheets

U.S. PATENT DOCUMENTS

| | | | |
|---|---|---|---|
| 6,466,976 B1 | 10/2002 | Alles et al. | |
| 6,493,349 B1 * | 12/2002 | Casey | 370/409 |
| 6,526,056 B1 | 2/2003 | Rekhter et al. | |
| 6,532,088 B1 | 3/2003 | Dantu et al. | |
| 6,553,423 B1 | 4/2003 | Chen | |
| 6,556,544 B1 | 4/2003 | Lee | |
| 6,636,516 B1 * | 10/2003 | Yamano | 370/395.52 |
| 6,639,897 B1 | 10/2003 | Shiomoto et al. | |
| 6,658,013 B1 | 12/2003 | de Boer et al. | |
| 6,668,282 B1 | 12/2003 | Booth et al. | |
| 6,697,360 B1 | 2/2004 | Gai et al. | |
| 6,738,821 B1 | 5/2004 | Wilson et al. | |
| 6,775,267 B1 | 8/2004 | Kung et al. | |
| 6,778,502 B2 | 8/2004 | Ricciulli | |
| 6,816,462 B1 | 11/2004 | Booth et al. | |
| 6,856,676 B1 * | 2/2005 | Pirot et al. | 379/201.01 |
| 6,883,170 B1 | 4/2005 | Garcia | |
| 6,894,994 B1 | 5/2005 | Grob et al. | |
| 6,907,039 B2 | 6/2005 | Shen | |
| 6,922,774 B2 | 7/2005 | Meushaw et al. | |
| 6,990,103 B1 | 1/2006 | Gollamudi | |
| 7,082,477 B1 | 7/2006 | Sadhasivam et al. | |
| 7,096,495 B1 | 8/2006 | Warrier et al. | |
| 7,221,945 B2 | 5/2007 | Milford | |
| 7,225,259 B2 | 5/2007 | Ho et al. | |
| 7,316,029 B1 | 1/2008 | Parker et al. | |
| 7,324,889 B2 | 1/2008 | Lyer | |
| 2001/0028636 A1 | 10/2001 | Skog et al. | |
| 2001/0048661 A1 | 12/2001 | Clear et al. | |
| 2004/0095932 A1 | 5/2004 | Astarabadi et al. | |
| 2004/0095934 A1 | 5/2004 | Cheng et al. | |
| 2005/0213589 A1 | 9/2005 | Shih | |

OTHER PUBLICATIONS

Hanaki, M, et al., "LAN/WAN management integration using ATM CNM interface", *IEEE Network Operations and Management Symposium*, vol. 1, (Apr. 15-19, 1996), 12-21.

Kapustka, K., et al., "CoSine Communications Moves VPNs 'Into the Cloud' with the Leading Managed IP Service Delivery Platform", http://www.cosinecom.com/news/pr_5_24.html, Press Release, CoSine Communications,(1999),5 p.

Keshav, Srinivsan, "An Engineering Approach to Computer Networking: ATM networks, the internet, and the telephone network", Reading, Mass. : *Addison-Wesley*, Addison-Wesley Professional Computing Series,(1997),318-324.

Rao, J. R., "Intranets and VPNs: Strategic Approach", *1998 Annual Review of Communications*, (1998),669-674.

Tanenbaum, A. S., "Computer Networks", Upper Saddle River, N.J. : *Prentice Hall PTR*, 3rd Edition,(1996),348-364.

Lawrence, J. Lang et al. "Connecting Remote FDDI Installations with Single-Mode Fiber, Dedicated Lines, or SMDS." Jul. 1990; ACM SIGCOMM Computer Communication Review. vol. 20, Issue 3; pp. 72-82.

IEEE Potentials Publication; "Local Area Networks" Dec. 1995/Jan. 1996; pp. 6. http://www.ece.uc.edu/-paw/potentials/sample.

Office Action dated Oct. 18, 2007 for U.S. Appl. No. 09/663,483.
Office Action dated Oct. 16, 2007 for U.S. Appl. No. 09/661,130.
Office Action dated Nov. 28, 2007 for U.S. Appl. No. 09/952,520.
A lightweight Protocol for Interconnection Heterogenous Devices in Dynamic Environments, (c) 1999, obtained from the Internet at : http://ieeexplore.ieee.org/iel5/6322/16898/00778477.pdf.
The Guide to Computing Literature, Jairo A.: A Framework and Lightweight Protocol for Multimedia Network Management, vol. 8, Issue 8, published 2000, ISSN: 1064-7570.
Bookfinder4u.com: High Performance Networks by Ahmed N. Tantawy, ISBN-10: 0792393716, Published 1993, Lightweight Protocols.
Non-Final Office Action for U.S. Appl. No. 10/991,969, dated Feb. 20, 2008.
Non-Final Office Action for U.S. Appl. No. 10/273,669, dated Feb. 20, 2008.
Non-Final Office Action for U.S. Appl. No. 10/949,943 dated Feb. 14, 2008.
Restriction Requirement for U.S. Appl. No. 11/556,697, dated Mar. 13, 2008.
Atkinson, Randall. Security Architecture for the Internet Protocol. Network Working Group. Nov. 10, 1996. 24 pages.
Kent, S. et al., IP Encapsulating Security Payload (ESP) Network Working Group. Mar. 26, 1997. 17 pages.
Notice of Allowance dated Dec. 1, 2004 for U.S. Appl. No. 09/661,636.
Amendment and Response filed Sep. 2, 2004 for U.S. Appl. No. 09/661,636.
Office Action dated May 28, 2004 for U.S. Appl. No. 09/661,636.
Amendment and Response filed Mar. 22, 2004 for U.S. Appl. No. 09/661,636.
Office Action dated Nov. 18, 2003 for U.S. Appl. No. 09/661,636.
Amendment and Response filed Apr. 29, 2007 for U.S. Appl. No. 09/661,130.
Office Action dated Dec. 28, 2006 for U.S. Appl. No. 09/661,130.
Amendment and Response filed Mar. 6, 2006 for U.S. Appl. No. 09/661,130.
Office Action dated Oct. 18, 2004 for U.S. Appl. No. 09/661,130.
Amendment and Response filed Apr. 9, 2004 for U.S. Appl. No. 09/661,130.
Office Action dated Nov. 5, 2003 for U.S. Appl. No. 09/661,130.
Notice of Allowance dated Jun. 14, 2007 for U.S. Appl. No. 10/067,106.
Amendment and Response filed Mar. 10, 2007 for U.S. Appl. No. 10/067,106.
Office Action dated Nov. 16, 2006 for U.S. Appl. No. 10/067,106.
Amendment and Response filed Aug. 28, 2006 for U.S. Appl. No. 10/067,106.
Office Action dated Mar. 27, 2006 for U.S. Appl. No. 10/067,106.
Amendment and Response filed Nov. 6, 2006 for U.S. Appl. No. 09/663,483.
Office Action dated Jul. 6, 2006 for U.S. Appl. No. 09/663,483.
Amendment and Response filed Mar. 13, 2006 for U.S. Appl. No. 09/663,483.
Advisory Action dated Nov. 12, 2004 for U.S. Appl. No. 09/663,483.
Amendment and Response filed Oct. 8, 2004 for U.S. Appl. No. 09/663,483.
Office Action dated Jun. 3, 2004 for U.S. Appl. No. 09/663,483.
Amendment and Response filed Feb. 26, 2004 for U.S. Appl. No. 09/663,483.
Office Action dated Aug. 21, 2003 for U.S. Appl. No. 09/663,483.
Amendment and Response filed Mar. 13, 2006 for U.S. Appl. No. 09/952,520.
Office Action dated Mar. 14, 2005 for U.S. Appl. No. 09/952,520.
Notice of Allowance dated Jul. 30, 2007 for U.S. Appl. No. 09/663,485.
Amendment and Response filed Jun. 11, 2007 for U.S. Appl. No. 09/663,485.
Office Action dated Jan. 11, 2007 for U.S. Appl. No. 09/663,485.
Amendment and Response filed Aug. 28, 2006 for U.S. Appl. No. 09/663,485.
Office Action dated Jul. 26, 2007 for U.S. Appl. No. 09/663,485.
Amendment and Response filed Feb. 2, 2006 for U.S. Appl. No. 09/663,485.
Office Action dated Dec. 21, 2004 for U.S. Appl. No. 09/663,485.
Amendment and Response filed Nov. 16, 2004 for U.S. Appl. No. 09/663,485.
Office Action dated May 14, 2004 for U.S. Appl. No. 09/663,485.
Amendment and Response filed Mar. 15, 2004 for U.S. Appl. No. 09/663,485.
Office Action dated Sep. 8, 2003 for U.S. Appl. No. 09/663,485.
Office Action dated Sep. 11, 2007 for U.S. Appl. No. 09/661,637.
Amendment and Response filed Jun. 20, 2007 for U.S. Appl. No. 09/661,637.
Office Action dated Feb. 8, 2007 for U.S. Appl. No. 09/661,637.
Amendment and Response filed Mar. 6, 2006 for U.S. Appl. No. 09/661,637.

Office Action dated Dec. 23, 2004 for U.S. Appl. No. 09/661,637.
Amendment and Response filed Aug. 5, 2004 for U.S. Appl. No. 09/661,637.
Office Action dated May 5, 2004 for U.S. Appl. No. 09/661,637.
Supplemental Amendment and Response filed Sep. 17, 2007 for the U.S. Appl. No. 09/663,457.
Notice of Allowance dated Nov. 21, 2006 for U.S. Appl. No. 09/663,484.
Amendment and Response filed Aug. 24, 2006 for U.S. Appl. No. 09/663,484.
Office Action dated Feb. 24, 2006 for U.S. Appl. No. 09/663,484.
Amendment and Response filed Feb. 7, 2006 for U.S. Appl. No. 09/663,484.
Office Action dated Apr. 6, 2005 for U.S. Appl. No. 09/663,484.
Amendment and Response filed Nov. 12, 2004 for U.S. Appl. No. 09/663,484.
Office Action dated May 6, 2004 for U.S. Appl. No. 09/663,484.
Amendment and Response filed Feb. 18, 2004 for U.S. Appl. No. 09/663,484.
Office Action dated Aug. 12, 2003 for U.S. Appl. No. 09/663,484.
Notice of Allowance dated Jan. 4, 2007 for U.S. Appl. No. 09/894,471,
Amendment and Response filed Nov. 2, 2006 for U.S. Appl. No. 09/894,471.
Office Action dated Oct. 26, 2006 for U.S. Appl. No. 09/894,471.
Amendment and Response filed Mar. 10, 2006 for U.S. Appl. No. 09/894,471.
Office Action dated Dec. 14, 2004 for U.S. Appl. No. 09/894,471.
Notice of Allowance dated Nov. 7, 2006 for U.S. Appl. No. 09/771,346.
Amendment and Response filed Oct. 18, 2006 for U.S. Appl. No. 09/771,346.
Office Action dated Jul. 18, 2006 for U.S. Appl. No. 09/771,346.
Amendment and Response filed Mar. 13, 2006 for U.S. Appl. No. 09/771,346.
Office Action dated Jan. 25, 2005 for U.S. Appl. No. 09/771,346.
Amendment and Response filed Oct. 14, 2004 for U.S. Appl. No. 09/771,346.
Office Action dated Mar. 26, 2004 for U.S. Appl. No. 09/771,346.
Notice of Allowance dated Nov. 19, 2006 for U.S. Appl. No. 10/163,162.
Amendment and Response filed Aug. 5, 2006 for U.S. Appl. No. 10/163,162.
Office Action dated May 5, 2006 for U.S. Appl. No. 10/163,162.
Notice of Allowance dated Jan. 4, 2007 for U.S. Appl. No. 10/163,261.
Amendment and Response filed Nov. 9, 2006 for U.S. Appl. No. 10/163,261.
Office Action dated Nov. 3, 2006 for U.S. Appl. No. 10/163,261.
Amendment and Response filed Aug. 22, 2006 for U.S. Appl. No. 10/163,261.
Office Action dated May 22, 2006 for U.S. Appl. No. 10/163,261.
Notice of Allowance dated Jul. 27, 2006 for U.S. Appl. No. 10/163,073.
Office Action dated May 30, 2007 for U.S. Appl. No. 10/273,669.
Amendment and Response filed Mar. 9, 2007 for U.S. Appl. No. 10/273,669.
Office Action dated Sep. 21, 2006 for U.S. Appl. No. 10/273,669.
Amendment and Response filed Jun. 21, 2006 for U.S. Appl. No. 10/273,669.
Office Action dated Feb. 21, 2006 for U.S. Appl. No. 10/273,669.
Notice of Allowance dated Aug. 14, 2007 for U.S. Appl. No. 10/163,071.
Amendment and Response filed Jul. 17, 2007 for U.S. Appl. No. 10/163,071.
Office Action dated Jul. 3, 2007 for U.S. Appl. No. 10/163,071.
Amendment and Response filed May 6, 2007 for U.S. Appl. No. 10/163,071.
Office Action dated Nov. 7, 2006 for U.S. Appl. No. 10/163,071.
Amendment and Response filed Sep. 1, 2006 for U.S. Appl. No. 10/163,071.
Office Action dated Jun. 1, 2006 for U.S. Appl. No. 10/163,071.
Amendment and Response filed Mar. 6, 2006 for U.S. Appl. No. 10/163,071.
Office Action dated Dec. 2, 2005 for U.S. Appl. No. 10/163,071.
Notice of Allowance dated Nov. 29, 2006 for U.S. Appl. No. 10/163,079.
Amendment and Response filed Nov. 1, 2006 for U.S. Appl. No. 10/163,079.
Office Action dated Oct. 27, 2006 for U.S. Appl. No. 10/163,079.
Amendment and Response filed Aug. 17, 2006 for U.S. Appl. No. 10/163,079.
Office Action dated May 17, 2006 for U.S. Appl. No. 10/163,079.
Notice of Allowance dated Jul. 17, 2007 for U.S. Appl. No. 10/298,815.
Amendment and Response filed Mar. 9, 2007 for U.S. Appl. No. 10/298,815.
Office Action dated Feb. 23, 2007 for U.S. Appl. No. 10/298,815.
Notice of Allowance dated Jun. 27, 2005 for U.S. Appl. No. 10/232,979.
Notice of Allowance dated Jul. 5, 2007 for U.S. Appl. No. 11/466,098.
Amendment and Response filed Aug. 10, 2007 for U.S. Appl. No. 10/163,260.
Office Action dated Aug. 1, 2007 for U.S. Appl. No. 10/163,260.
Amendment and Response filed May 23, 2007 for U.S. Appl. No. 10/163,260.
Office Action dated Apr. 13, 2007 for U.S. Appl. No. 10/163,260.
Amendment and Response filed Mar. 13, 2007 for U.S. Appl. No. 10/163,260.
Office Action dated Dec. 21, 2006 for U.S. Appl. No. 10/163,260.
Amendment and Response filed Sep. 18, 2006 for U.S. Appl. No. 10/163,260.
Office Action dated May 18, 2006 for U.S. Appl. No. 10/163,260.
Office Action dated Aug. 22, 2007 for U.S. Appl. No. 10/650,298.
Response to Restriction Requirement Apr. 26, 2004 for U.S. Appl. No. 09/663,483.
Restriction Requirement dated Mar. 22, 2004 for U.S. Appl. No. 09/663,483.

* cited by examiner

SYSTEM AND METHOD FOR MANAGING INTERWORKING COMMUNICATIONS PROTOCOLS

FIELD

The present invention relates generally to computer network routers, and more particularly to systems and methods of managing interworking protocols for such routers.

RELATED FILES

This application is related to the following cofiled, copending and coassigned applications:

"SYSTEM AND METHOD FOR MANAGING AND PROVISIONING VIRTUAL ROUTERS", Ser. No. 09/663,485, filed Sep. 13, 2000, now U.S. Pat. No. 7,272,643

"SYSTEM AND METHOD FOR MANAGING ROUTER METADATA", Ser. No. 09/663,484, filed Sep. 13, 2000, now U.S. Pat. No. 7,174,372 and to two provisional applications each titled "SYSTEMS AND METHOD FOR DELIVERING INTERNETWORKING SERVICES" Ser. No. 60/232,577 and Ser. No. 60/232,516;

all of which are hereby incorporated herein by reference for all purposes.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2000, CoSine Communications, Inc. All Rights Reserved.

BACKGROUND

As computer networking technology has evolved, a number of different communications protocols have been developed. For example, TCP/IP, Frame Relay, ATM (Asynchronous Transfer Mode) protocols currently exist, along with other communications protocols. Each of these protocols has different defining characteristics, such as supported bandwidth, reliability and communications distances. It is often desirable to have two or more protocols work together. In previous systems, configuring a network to support such interworking protocols is largely a manual process, prone to errors, and in general difficult to accomplish.

As a result, there is a need in the art for the present invention.

SUMMARY

The above-mentioned shortcomings, disadvantages and problems are addressed by the present invention, which will be understood by reading and studying the following specification.

In one embodiment of the invention, a computerized method for managing interworking protocols, applies policies that aid in provisioning a first interface, having a first protocol, a transport network having a second protocol, a virtual circuit within the transport network; and a second interface, having the same protocol as the first.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense.

In the Figures, the same reference number is used throughout to refer to an identical component which appears in multiple Figures. Signals and connections may be referred to by the same reference number or label, and the actual meaning will be clear from its use in the context of the description.

The detailed description is divided into multiple sections. In the first section the hardware and operating environment of different embodiments of the invention is described. In the second section, the software environment of varying embodiments of the invention is described. In the final section, a conclusion is provided.

Hardware and Operating Environment

Figure 1:
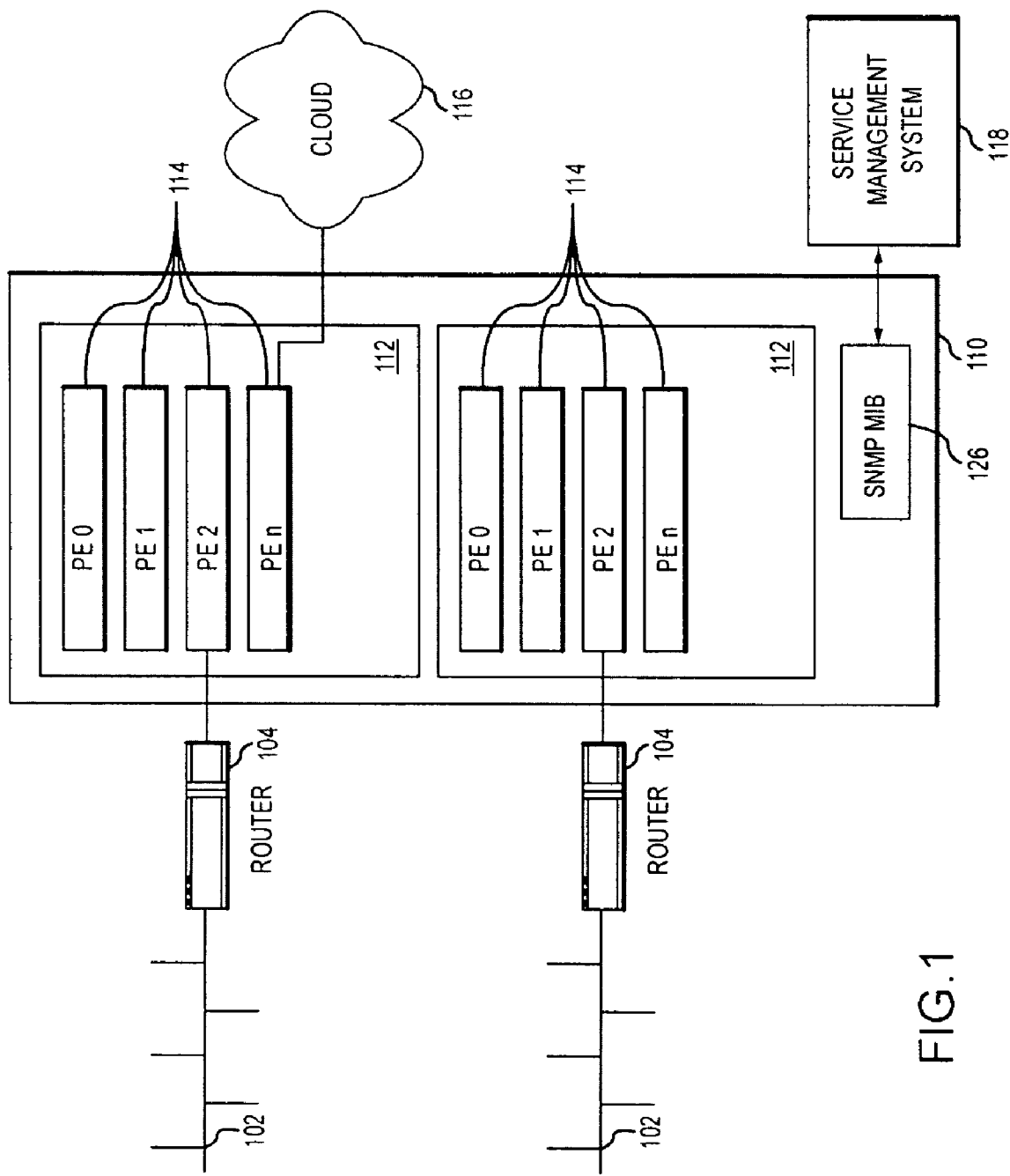
FIG. 1 is a block diagram of the hardware and operating environment in which different embodiments of the invention can be practiced.

FIG. 1 is a diagram of the hardware and operating environment in conjunction with which embodiments of the invention may be practiced. The description of FIG. 1 is intended to provide a brief, general description of suitable computer routing hardware and a suitable computing environment in conjunction with which the invention may be implemented. Although not required, the invention is described in the general context of computer-executable instructions, such as program modules, being executed by a computer, such as a personal computer or a server computer. Generally, program modules include routines, programs, objects, components, data structures, etc., that perform particular tasks or implement particular abstract data types.

As shown in FIG. 1, the system 100 includes a service processing switch 110, access routers 104, service management system 118, and customer network management system 106. In some embodiments, service processing switch 110 provides switching, routing and computing resources that can be allocated by a service provider to customers. In one embodiment, the service processing switch 110 is the IPSX 9000 service processing switch from CoSine Communications, Inc. However, the invention is not limited to any particular switch, router or service processing hardware.

Service processing switch can contain one or more blades 112. In some embodiments of the invention, blades 112 have a type associated with them. Examples of blade types include, processing functions such as network blades, control blades, trunk blades, and processor blades. Network blades provide interfaces to different types of networks. Control blades provide system management and accounting functions to the service processing system 110. Trunk blades provide access to high speed trunk networks. Processor blades provide general purpose computer processors that in some embodiments of the invention provide firewall, intrusion detection, or directory services. Blades are communicably coupled to one another, in one embodiment a packet ring is used to couple the blades.

In some embodiments, each of blades 112 includes one more processing elements 114. Processing elements 114 include CPU and memory that provide computing resources for the blade. The invention is not limited to any particular number of processing elements on a blade, nor is the invention limited to any particular number of blades in a service processing switch 110.

Service processing system 110 is typically communicably coupled to a network 116, for example the Internet. Network 116 can also be a Wide Area Network (WAN), a Local Area Network (LAN), or a private network.

Service processing system 110 is also typically communicably coupled to a plurality of customer networks 102 via customer access routers 104.

Service management system 118 is communicably coupled to service processing system 110, and hosts software that is used to configure and control the operation of service processing switch 110. In one embodiment of the invention, the service management system is a SPARC system available from Sun Microsystems, Inc. running the InVision product from CoSine Communications, Inc. Service management system 118 can be used to define and allocate resources within service processing switch 110 to various customers. In some embodiments, the Simple Network Management Protocol (SNMP) is used to communicate with the service processing system and to update SNMP MIB 126.

Figure 2:
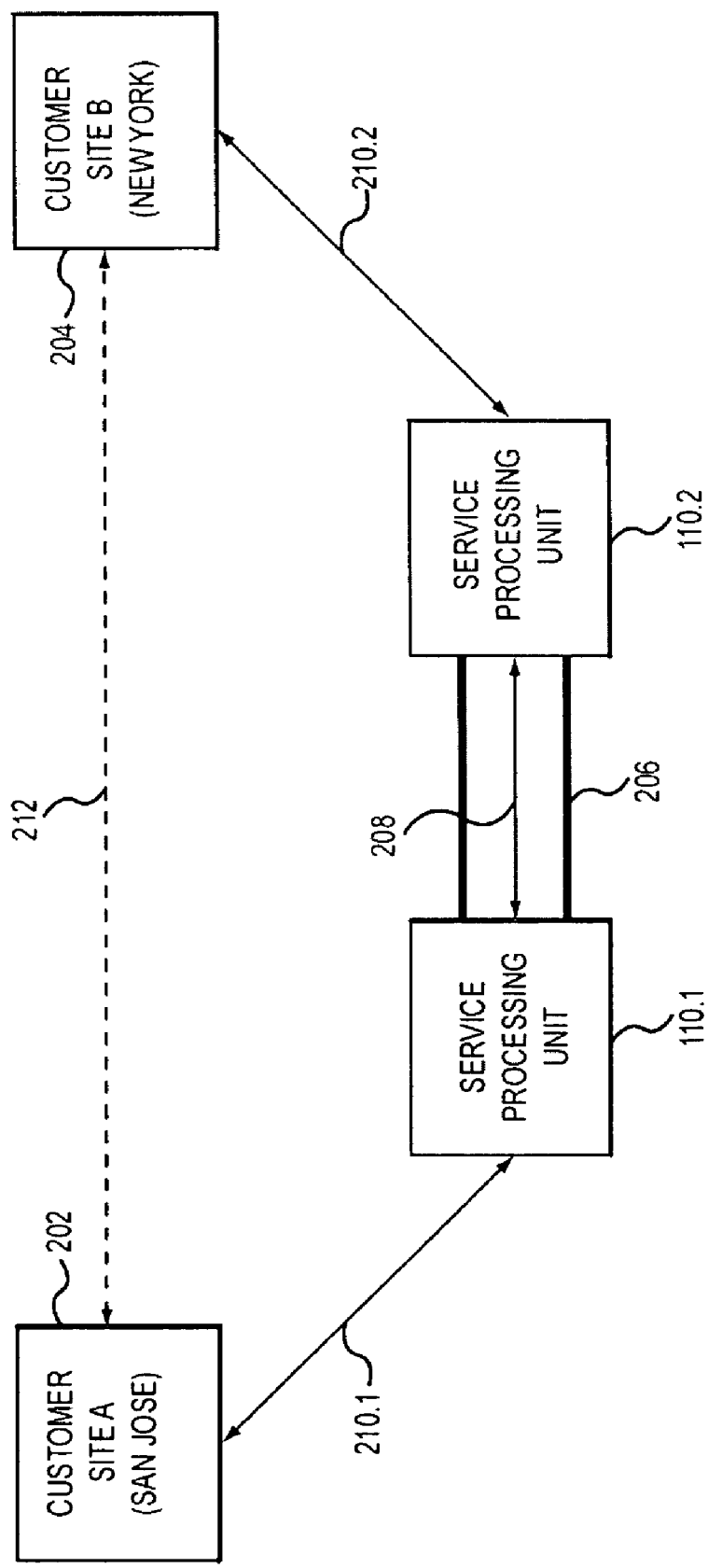
FIG. 2 is a block diagram illustrating an exemplary Frame of IP configuration according to an embodiment of the invention.

FIG. 2 illustrates an exemplary configuration in which two network protocols interwork. In the exemplary configuration, a customer manages two sites A and B, 202 and 204 respectively, and wishes to establish a logical network connection 212 between the two. In the exemplary scenario, the customer desires to use Frame Relay protocols in and out of the two sites. However, it is impractical to establish a Frame Relay link directly between the two sites. As a result, the customer establishes a Frame Over IP (FRoIP) link between the two sites 202 and 204. In order to establish this link, two service processing switches 110.1 and 110.2 are used. Switch 110.1 is located near to site 202, and switch 110.2 is located near site 204, allowing a Frame Relay link to be established between each of the sites and its corresponding switch. Transport 208 is used to communicably couple switches 110.1 and 110.2, and a private virtual circuit (PVC) 206 is established within transport 208. The end result is that a FRoIP connection between the switches 110.1 and 110.2 allows Frame Relay packets to be transmitted between sites 202 and 204.

Those skilled in the art will appreciate that the invention may be practiced with other routing system hardware configurations besides those described above.

Methods for Provisioning Interworking Protocols

Figure 3:
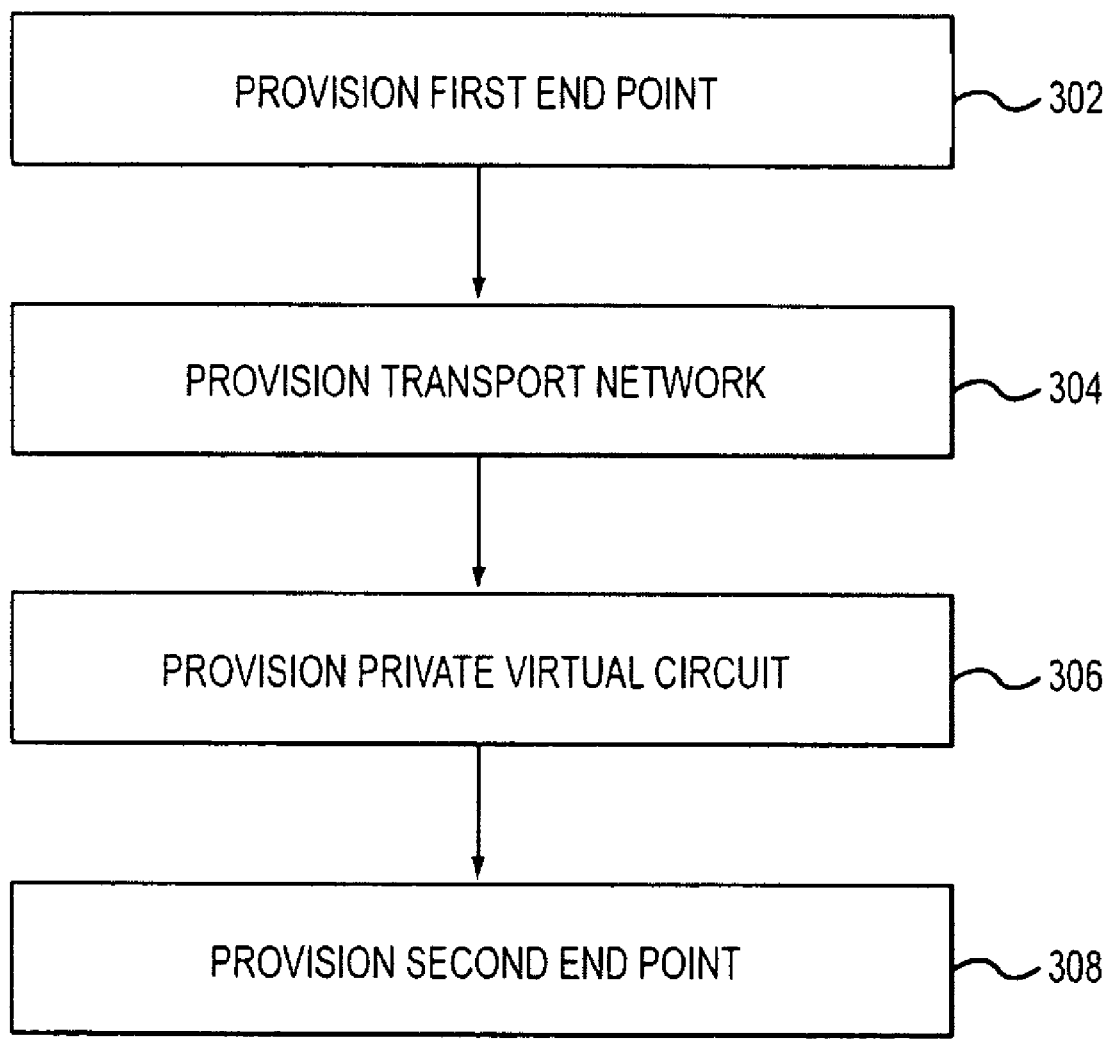
FIG. 3 is a flowchart illustrating a method according to an embodiment of the invention.

In the previous section, a system level overview of the operation of exemplary embodiments of the invention were described. In this section, the particular methods of the invention performed by an operating environment executing an exemplary embodiment are described with reference to a flowchart in FIG. 3. The methods to be performed by the operating environment constitute computer programs made up of computer-executable instructions. Describing the methods with reference to a flow chart enables one skilled in the art to develop such programs including such instructions to carry out the methods on suitable computers (the processor of the computer executing the instructions from computer-readable media). The method described below are inclusive of the acts required to be taken by an operating environment executing an exemplary embodiment of the invention.

The method begins when a system executing the method, such as service management system 118, provisions a first endpoint for an interworking protocol (block 302). Depending upon the particular embodiment, the provisioning of the endpoint can be accomplished either manually, or it can be accomplished using the policy based provisioning methodologies described below, such as those described with reference to FIG. 8.

Next, the system proceeds to provision the transport network (block 304). Again, the transport network interfaces can be provisioned using predefined policies. In the case of Frame Over IP (FRoIP) provisioning, one embodiment of the invention includes the following parameters that can be determined by policies:

default window-size—the window size determines the length of the buffered packet sequence. It enables the FRoIP instance to hold a series of IP packets in a memory buffer, in preparation for reassembly of the original frame sequence that is ultimately sent to its destination DLCI. The default-window-size applies to all subsequent FRoIP transports that are created. If this value is changed after some transports already exist, only subsequent newly created transports will use the new default. The default value is 4 packets, and permissible value range from 1 to 10.

default window-timeout—the window-timeout sets the time limit for holding packets in the buffer before they are sent to their destination. It is measured in milliseconds. The default value is 10000 milliseconds or 10 seconds total. As with default window-size, this value is used as a global default for all transports.

max-transport—the maximum number of transports that can be terminated at the FRoIP instance. The default value is 24. The number of transports that can be run depends on the load in the system, and on the particular blade.

local VI—the Virtual Interface, identified by its number, across which the Frame Relay traffic is to be carried. This value cannot be changed while active Frame Relay transports are running.

permit-bad-event—the number of allowed bad events, such as a failure to reassemble a frame, that are permitted before the ISPX 9000 declares the FRoIP transport to be taken down by the switch. The same number is used as a criterion for re-enabling the transport. See event-window-size below for more details. The default is 3 events.

event-window-size—this feature interacts with the permit-bad-event setting. In other words, if a number of events <event-window-size> occurs that is carrying a <permit-bad-event> number of bad events, the transport is taken down by the Control Blade. For example, if for every 10 events three or more events are bad, the interface (transport) is marked as down. Conversely, if three or more events subsequently are known as good in a following sequence, the interface is re-enabled by the Control Blade. Thus, this setting operates for both states: good events and bad events.

keep-alive-period—the keep-alive interval is the period of time between issued "keep this Frame Relay connection live" messages from the local transport. This value is specified in seconds.

admin-status—admin-status is a switch that enables or disables FRoIP Transport configuration on the current switch. The default is enabled.

window-size—this value corresponds to the default-window-size value that is specified at the FRoIP level. If you change this value, it overrides the FRoIP default-window-size value for the local transport, otherwise it automatically uses the default window-size value previously defined in the FRoIP level.

window-timeout—this value corresponds to the default-window-timeout value that is specified at the FRoIP level, and overrides the default value as described for window-size.

Next, a private virtual circuit is provisioned (block 306). Again, a user can select from a set of predefined policies in order to supply configuration parameters related to the provisioning. In one embodiment of the invention, the following transport parameters can be set using policies:

BC Committed Burst Size
BE Excess Burst Size
CIR Committed Information Rate

Finally, a second end point is provisioned (block 308). Like the other previously described blocks, the second end point can be provisioned using predefined policies.

Figure 4:
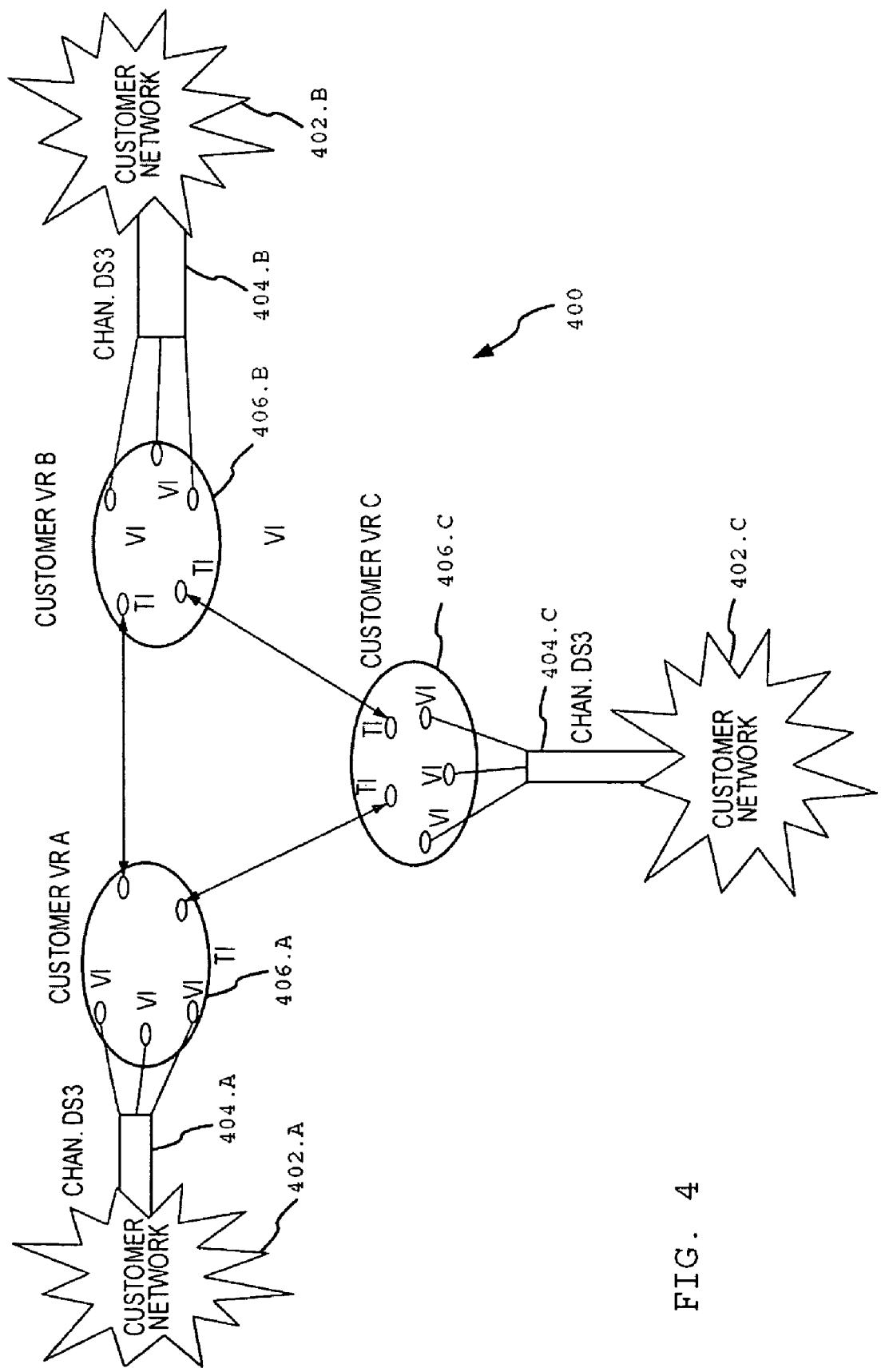
FIG. 4 is a diagram illustrating an exemplary Virtual Private Network (VPN) used in an embodiment of the invention.

FIG. 4 provides an illustration of a VPN as used in various embodiments of the invention. A VPN is typically a logical grouping of virtual routers (VRs) 406. The connectivity between VPNs and customer sites 402 is provided by means of virtual interfaces (VIs). Users can create VIs and connect them to customer sites or to VIs of other VRs. The virtual connection can also be configured to be a tunnel interface (TI) to a type of secured tunnel, such as an IPSec tunnel. Customer sites can be connected via a network interface 404, which can be a leased line interface such as DS3. The invention is not limited to any particular type of network interface.

Figure 5:
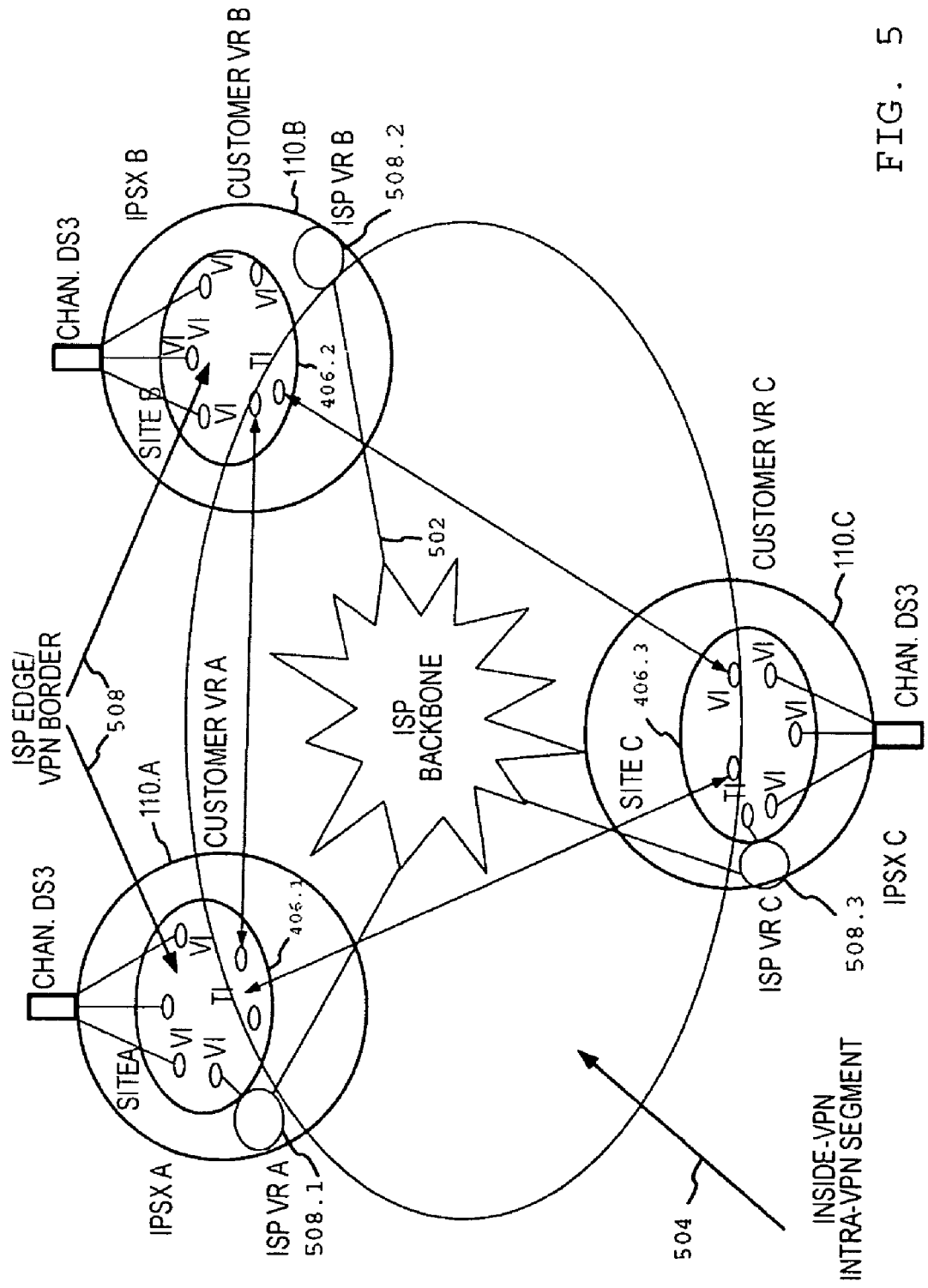
FIG. 5 is a diagram illustrating further details regarding segments of an exemplary VPN used in accordance with various embodiments of the present invention.

In some embodiments of the invention, two types of virtual routers are supported:

Customer VRs and ISP VRs. Customer VRs are used to build customer VPNs, and ISP VRs are used to build ISP VPN. The ISP VPN is connected to an ISP backbone network 510 (FIG. 5). In this framework, each ISP needs only one ISP VPN. Customer VRs can be connected to the ISP VPN by means of VIs. Every virtual router can use one or more routing protocols, including STATIC, RIP, OSPF, and BGP, to disseminate reachability information. For routing purposes, every VPN based on this framework can be treated as an extension of the customer network.

Various embodiments of the invention allow network managers to define profiles. The profile information may be used to automatically generate the routing configuration for a VPN. In some embodiments, to profile the routing on a VPN, a customer VPN is divided into three segments, which are illustrated in FIG. 5.

ISP-Edge segment 305 is a VPN segment that connects the VPN to customer sites.

This segment includes all virtual interfaces connected to logical interfaces and tunnel interfaces whose remote end is outside the VPN. This segment is used for disseminating customer site reachability information.

Inside-VPN segment 504 (also referred to as an Intra-VPN segment) is a VPN segment that provides connectivity among different VRs 406. This segment is used to disseminate intra-VPN reachability information.

Inter-VPN segment 502 is a VPN segment that connects different types of VPNs; for example, the interfaces that connect a customer VPN with an ISP VPN.

It is desirable to identify segment types, because it provides a mechanism for generating profiles that can be optimized depending on the segment type.

Profile-Based Routing Configuration

Figure 6:
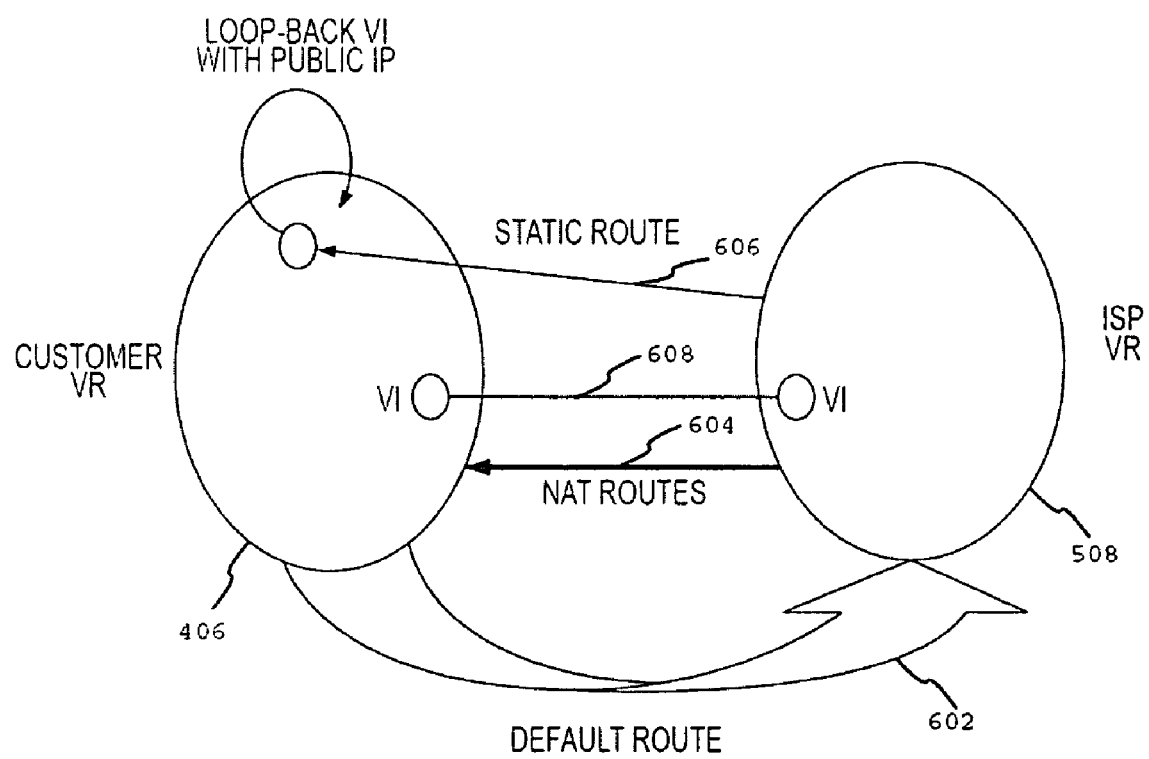
FIG. 6 is a diagram illustrating inter-VPN reachability according to one embodiment of the present invention.
Figure 7:
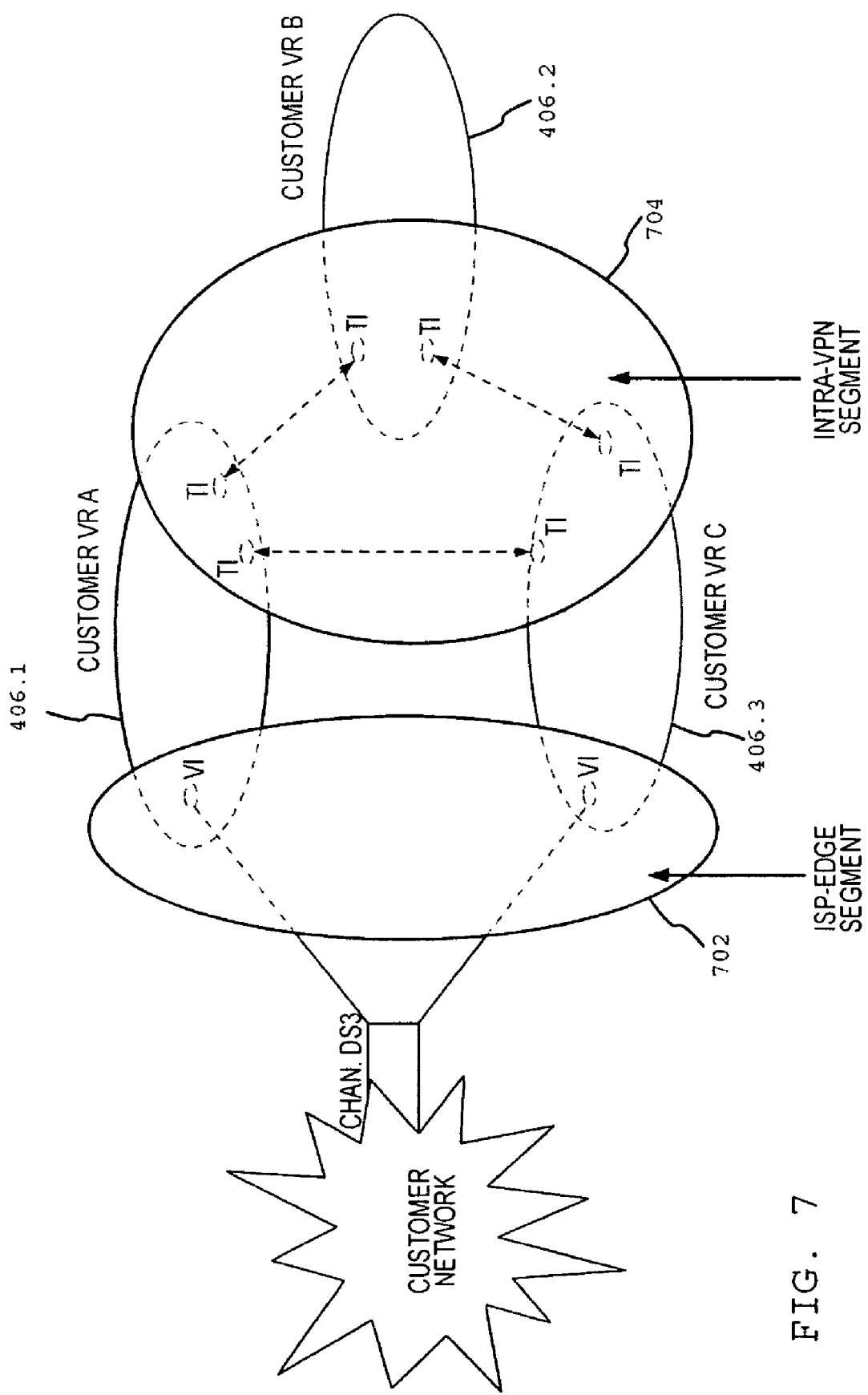
FIG. 7 is a diagram illustrating dynamic intra-VPN routing according to one embodiment of the present invention.

FIG. 6 illustrates how the routing needs of the Inter-VPN segment 302 may be taken care of at the time a customer VR 406 is created. When a customer VR 406 is created, the user is given the option to automatically connect the VR with an ISP VR 508. At that time, service management system 118 (FIG. 1) may also create a default route 602 on the customer VR 406 and a static route 606 on the ISP VR 508, which accommodates customer VR 406 to ISP VR 508 connectivity. In this model, in accordance with one embodiment, for all network address translation (NAT) addresses 604, the user adds static routes on the ISP VPN.

The profile discussed here takes care of the first two VPN segments: ISP-Edge 506 and Intra-VPN 504. Given a VPN's routing requirements, there are typically three routing aspects that are considered:

1) The routing protocol that should be turned on a virtual interface in a VR
2) When and how to redistribute routes between various routing protocols.
3) When enabling a routing protocol on a router or interface, the routing parameters to use for optimizing performance.

Service management system 118 (FIG. 1) uses VPN profile data to automatically generate the required routing configuration. In some embodiments of the invention, Border Gateway Protocol (BGP) is excluded as a possible choice for configuring customer VPNs. There are a few reasons for this. First, there are only two cases in which BGP would be used in a VPN environment. ISP-VPNs might use BGP to talk to the Internet core. Also, if a VPN connects two very large customer sites, BGP might be needed for the Intra-VPN segment to ensure scalability. There will generally be very few ISP VPNs (in most networks, there is only one), and it's unlikely that a VPN will be used to connect two or more large sites.

The second reason for excluding BGP from the profile is the VR-specific customization that is required to make BGP work in a VPN environment. Because BGP connects ISP VRs to the ISP core, a careful selection of export and import policies is needed to minimize the number of routes in each ISP VR. It is very difficult to represent this type of configuration by means of a generic routing profile. Service management system 118 (FIG. 1) provides an interface to configure BGP on VRs. This interface allows user to enable BGP on a VR, set its BGP neighbors, and add import and export policies.

In some embodiments of the invention, the profile defines a simple routing configuration, that is, static routing for the Intra-VPN segment. Thus, static routing will be used to communicate with each customer site. This configuration is desirable because it puts a minimum load on the device, thus increasing the number of VPNs that can be managed by each service processing switch 110.

There are two issues with static routing. First, ISPs need to manage static routes for each customer. As new subnets are added to customer networks and old ones are removed, the static routes corresponding to these subnets should be added or removed in the corresponding VPNs. In some embodiments, this problem can be solved by having service management system 118 (FIG. 1) take ownership of automatically managing static routes based on the customer site subnet information. In these cases, customers can directly add or remove subnet information using tools such as the customer network management system 106 (FIG. 1). This capability will transfer the ownership of managing routing to customers.

A second issue with static routing is that the routing by definition is STATIC. If a site interface is down, traffic cannot be re-routed to an alternate path. A partial solution to this problem can be provided by allowing customers to disable routing on a site that is down. This can be done by means of customer network management system 106 (FIG. 1). In this scenario, service management system 118 (FIG. 1) would remove the static routes from the network that belongs to the site that is down. This action would allow the traffic to go through the backup path.

To resolve the two issues described above, embodiments of the invention provide a mechanism for a user to choose more advanced routing options in profiles. For smaller sites, a viable option is Routing Information Protocol (RIP), while larger sites operators might choose Open Shortest Path First (OSPF) gateway protocol. The dynamic routing transfers the burden of managing route changes from the network manager to the device. If a user selects dynamic routing at the edge, then the service management system will also have to use dynamic routing to disseminate Intra-VPN reach ability information. FIG. 5 illustrates this scenario. If a site link to virtual router A 206.1 is down, virtual router B 206.2 will know that the traffic going through that link needs to be rerouted to virtual router C 206.3 only if dynamic routing is specified for Intra-VPN segment 504.

If all the sites (ISP-Edge segment) are using static or RIP routing, service management system 118 will allow the user to choose between RIP and OSPF for Intra-VPN routing. The user will typically select RIP if there are relatively few VRs in the VPN. Because OSPF is more scalable, it is a logical choice for bigger VPNs. If a user decides to run OSPF at a site edge, it is desirable to select OSPF for the Intra-VPN segment.

This section has described the various software components in a system that provides for the automatic generation and provisioning of routing configurations. As those of skill in the art will appreciate, the software can be written in any of a number of programming languages known in the art, including but not limited to C/C++, Java, Visual Basic, Smalltalk, Pascal, Ada and similar programming languages. Embodiments of the present invention are not limited to any particular programming language for implementation. Additionally, as the generation and provisioning of routing configurations may also include manual steps, embodiments of the present invention are not limited to wholly automated methods.

Methods for Performing Profile-Based Routing Configuration

Figure 8:
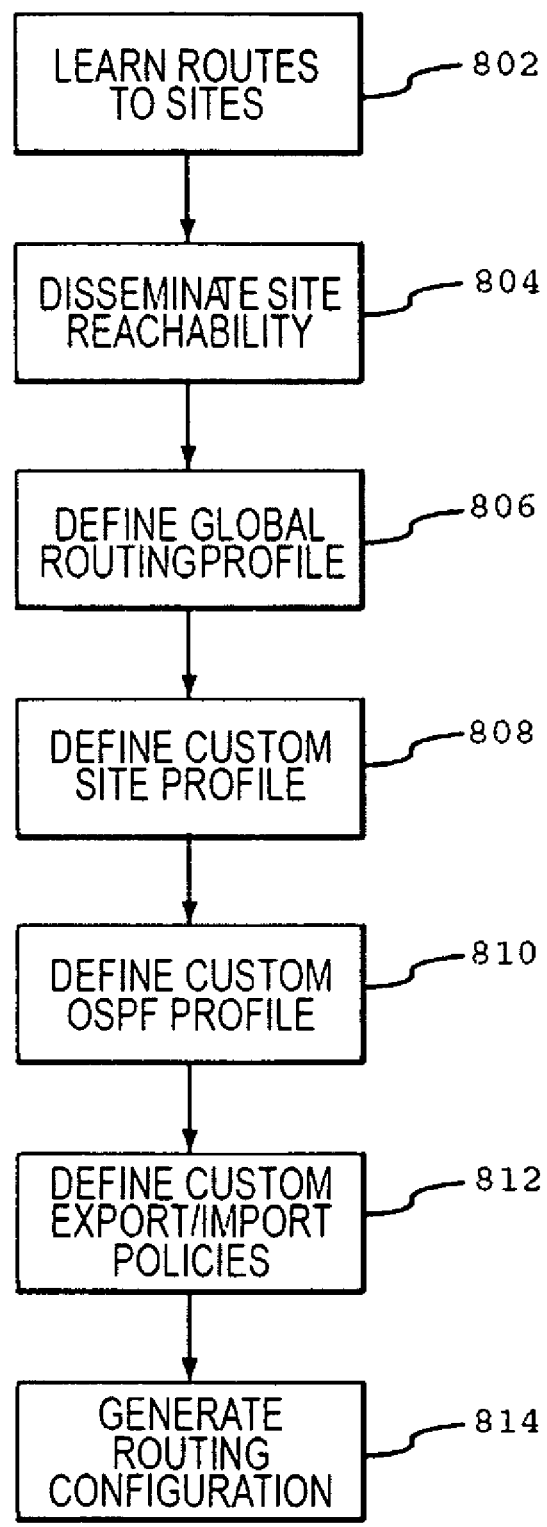
FIG. 8 is a flowchart illustrating a method for provisioning a router configuration according to an embodiment of the present invention.

In the previous section, a system-level overview of the operation of exemplary embodiments of the invention was provided. In this section, a process for automatically generating and provisioning routing configurations in accordance with a particular embodiment is described with reference to a flowchart shown in FIG. 8. The methods to be performed by the operating environment may constitute computer programs made up of computer-executable instructions. Describing the methods with reference to a flowchart enables one skilled in the art to develop such programs including such instructions to carry out the methods on suitable computers (the processor of the computer executing the instructions from computer-readable media). The method illustrated in FIG. 8 is inclusive of the acts required to be taken by an operating environment executing an exemplary embodiment of the invention.

The method begins at block 802 when a system executing the method learns, or discovers, the current routes to sites connected via the service processing switch 110 (FIG. 1). To build or include new sites in a VPN, each edge router must learn the routes to all sites connected to all the edges in the network. An edge in a network is a boundary between two routers, an edge router is typically a network device that routes data between one or more local area networks backbone network. Two components of routing information are typically needed for the VPN:

1) Site Reachability Information: Each edge router needs to learn the set of VPN addresses and address prefixes reachable at each site. The reachability information needed by the Customer Provided Equipment (CPE) router depends on site configuration. Customer sites are characterized into two categories: stub sites and non-stub sites. The CPE routers of stub sites have default routes pointing to an ISP edge router, while the CPE router of non-stub site do not, and therefore need to know the set of non-local destinations reachable via that link. Usually, if a VPN also provides Internet connectivity to a site and there is no backdoor connection between this and any other site, it is a stub site.

2) Intra-VPN Reachability Information: Once an edge router has learned the set of prefixes associated with each of its In addition to the above, several mechanisms for Disseminating Intra-VPN Reachability Information can be used. In one embodiment employing static configuration, the service management system 118 can use the subnets configured for each site to automatically create static routes for dissemination of intra-VPN reachability information.

In an alternative embodiment, directory lookup information is used. In addition to VPN membership information, a central directory can maintain a listing of the address prefixes associated with each end point.

In a further alternative embodiment, each edge router runs an instance of a routing protocol on each VPN to disseminate intra-VPN reachability information. Using this mechanism, both full-mesh and arbitrary, VPN topologies can be easily supported.

A still further alternative embodiment uses a Link Reachability Protocol. Here each edge router can run a link reachability protocol carrying the necessary information. This protocol runs across the tunnel between the two edge routers. The two preferred choices for this approach are a variation of MPLS LDP and IBGP. The link reachability protocol-based schemes can support only fully meshed VPNs.

In yet a further alternative embodiment, site reach ability information is disseminated by Piggybacking on IP Backbone Routing Protocols. The set of address prefixes associated with each stub interface can also be piggybacked into the routing advertisements from each edge router and propagated through the network. Other edge routers extract this information from received route advertisements. This scheme typically requires that intermediate routers cache intra-VPN routing information to propagate the data further. This also has implications for the level of security possible for intra-VPN routing information.

In addition to learning and disseminating site reachability information, a global routing profile can be defined (block 806). In one embodiment of the invention, the global routing profile includes the following parameters:
  a. Routing administration status
  b. Routing protocol for Intra-VPN segments
  c. Default routing protocol at the ISP edge. All the customer sites will generally inherit this.
  d. Default site type: stub or non-stub: Stub sites have a default route going toward the ISP VPN (Internet). For stub sites, there is no need to export routes from the VPN. This information is used in creating default export and import policies.
  e. If the routing protocol for the Intra-VPN segment is OSPF, define the OSPF profile topology type.

When a site is added, it inherits the routing configuration from the routing profile.

In addition, the system provides for the definition of a custom site profile (block 808). Multiple types of site information can be configured. First, if the site routing profile needs to be customized, the user may do so. Second, if a user wants static routing at the edge, the network subnets that are associated with the site must be provided. This configuration will allow the service management system to automatically create static routes. In one embodiment of the invention, the site profile contains following parameters:
  a. Routing Protocol at the ISP edge
  b. Site Type: stub or non-stub
  c. OSPF Area ill: If OSPF is enabled at the edge
  d. Site subnets.

In addition, a custom OSPF profile can be defined (block 810). When a user configures a routing profile, service management system 118 (FIG. 1) automatically generates OSPF, RIP, and static profiles, if needed. In many cases, the user will want to customize the generic OSPF profile. The user can customize the generated profile using a policy-based profile configuration workflow. The workflow includes the following features:
  1) The user can define custom OSPF areas. He only needs to configure what VRs are included in what areas; Service management system 118 (FIG. 1) generates the required configuration for each VR and VI.
  2) The user can define a route aggregation policy for an OSPF area; Service management system 118 (FIG. 1) will auto-generate this configuration for all the VRs in that area.
  3) By default, Service management system 118 (FIG. 1) generates one VR routing parameter policy, which applies to all VRs, and three VI routing parameter policies which apply to tunnel interfaces, customer site edges, and VI-VI connections. When routing configuration is generated, these policies are used to define routing parameters. The user can make changes in any of these policies, or create his own policies and assign them as defaults. The user also can define policies and set them to be applied on a set of VRs or VIs. Service management system 118 (FIG. 1) allows users to individually customize parameters for a VR or VI.

When configuring OSPF for intra-VPN segment, the service management system cannot use the same guidelines as those used in setting up a normal OSPF network, because each router in a VPN is a virtual router. To optimize performance, it is desirable to minimize the size of the routing table. This can be accomplished by keeping the OSPF areas small. In a normal OSPF network, the network manager would not let the size of an OSPF area grow beyond 50-60 routers. With a VPN, it is desirable to not let the OSPF area grow beyond 20-25 VRs. The larger the OSPF area, the higher the load on each VR, and hence the fewer the VRs that can be created on the service processing switch. As a result, it is not desirable to make a complete mesh of all the VRs in a large VPN. The user should use a custom OSPF topology and create areas of reasonable size to ensure scalability and stability of the OSPF network.

The system also provides for the definition of custom export/import policies (block 812). Using the router and site profile defined above, service management system 118 (FIG. 1) generates default policies necessary for different routing protocols to talk to each other. In some situations, custom export and import policies are needed to control access to critical networks. The system allows users to add custom export and import policies.

Based on the site reachability information and/or the global and custom profiles described above, the service management system generates routing configuration (block 814). Described below are items that are considered during the generation of the configuration:
  The user can only configure one protocol for the Intra-VPN segment. This configuration is used to configure the routing on all the interfaces that connect one VR to another in the same VPN. In most cases, this takes care of all tunnel interfaces.
  If the user selects static routing for a site, service management system 118 (FIG. 1) will auto-generate one static route per site subnet on the local VR. If the routing for the Intra-VPN segment is also static, service management system 118 (FIG. 1) will also generate one static route per subnet on each remote VR. Auto-generation of static routes assumes a meshed-topology for the VPN. If the topology is not meshed, some additional configuration may be needed for the routing to work.
  If select dynamic routing is selected for the Intra-VPN segment, service management system 118 (FIG. 1) auto-generates export policies to disseminate site reachability information to other VRs.
  For a non-stub site that is using dynamic routing to communicate with the VPN, service management system 118 (FIG. 1) will create an export policy to inject all the routes learned from the Intra-VPN segment's routing into the customer network.
  If the user selects a custom OSPF topology for the Intra-VPN segment, he does not have to explicitly assign an area 10 for each interface. Service management system 118 (FIG. 1) automatically interprets this information from the area configuration.
  Once the profile is set, Service management system 118 (FIG. 1) automatically handles the routing configuration for the addition and deletion of VRs and VIs. For example, if standard OSPF routing has been selected for the Intra-VPN segment, whenever the user creates an IPSec tunnel connecting two VRs, OSPF will be enabled with area ID 0.0.0.0.

If a VPN is using only one routing protocol for the Intra-VPN segment, service management system 118 (FIG. 1) can discover routing profiles from the device configuration.

Service management system 118 (FIG. 1) supports explicit two-phase provisioning of routing profile configurations. In the first phase, the user makes changes to the routing profile and saves them in the database. In the second phase, the user commits the profile to the network. In this phase, the server translates delta changes in the profile configuration into a required low-level configuration and pushes it to appropriate devices.

Service management system 118 (FIG. 1) allows users to temporarily remove routing configurations from the device. Users can do this by providing administration status attributes for the routing profile. Setting this attribute to a "disabled" state and committing the profile removes configurations from the device. Routing can be turned on again by setting the admin status to "enabled."

As can be seen from the above, the generated and customized policies can act as templates that can be applied to particular VPNs, particular VRs, or groups of VRs. For example, assume an existing policy has been changed or further customized. In one embodiment of the invention, the user is presented with a list of VRs or VPNs that were configured with the existing policy. The user can then select the VRs to which the new policy should be applied.

Similarly, assume that the user wishes to change the policy for a particular VR. In one embodiment of the invention, the user selects the desired VR, and then selects a new policy to be applied to the VR. The new policy can then be applied immediately, or it can be applied at a later scheduled time.

In addition, the policies can be used as a differentiator in providing VPN services. If user selects STATIC routing for ISP-Edge and Intra-VPN segments, the service processing switch does not need to run any routing instances per customer VR. On the other hand, if a user has chosen to run dynamic routing for Intra-VPN and ISP edge segments, the switch may have to run instances of routing protocols such as OSPF and RIP. Running routing instances on virtual routers consumes both processing power and memory on the processing elements and blades. The demand on the resources will depend on the size of VPN and its interaction with various customer sites. An ISP can recover the cost of the increased resource usage, by using routing as a differentiator in providing VPN services. The following are a few exemplary methods of providing services:

1) Allow user to select the routing protocol per site: STATIC, RIP, or OSPF. Based on the site configuration, ISP can automatically configure routing protocol for intra-VPN segment. The cost of the service should be the lowest for STATIC and the highest for OSPF.

2) Define a few fixed routing profiles and sell them as a part of service packages such as Gold, Silver, and Bronze. For instance, Gold will allow user to select OSPF for intra-VPN as well as ISP edge segment. Silver will allow user to configure OSPF for intra-VPN segment, while RIP for ISPF edge. The bronze package will permit customer to configure STATIC for ISP edge as well as Intra-VPN segment.

3) Provide additional services as part of a profile. For example, include firewall, intrusion detection, network address translation, proxy services, or other network services as part of a differentiated service package. The service can then be included in profiles defined as part of the service package, and excluded from profiles for customers that do not pay for the service Further details on the provisioning of interworking protocols can be found in Appendix A.

CONCLUSION

Systems and methods for managing interworking communications protocols are disclosed. The embodiments of the invention provide advantages over previous systems. For example, policies can be used to make it easier to provision the various components of an interworking networking system, reducing or eliminating the need for manual configuration.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

What is claimed is:

1. A computerized method for managing interworking protocols comprising the following computer-implemented steps:

reading a predetermined policy definition from a computer-readable media;

a service management system (SMS), operable to automatically configure and control operation of service processing switches, communicatively coupled with a plurality of service processing switches of a service provider, provisioning a first interface of a first service processing switch of the plurality of service processing switches, the first interface associated with a first site of a subscriber of a service provider based upon parameters provided from the predetermined policy definition, said first interface configured to communicate data in accordance with a first protocol, the parameters including a window size, a window timeout, a number of allowed bad events, an event window size and a keep-alive interval;

the SMS provisioning a transport network to provide a transport between the first interface and a second interface of a second service processing switch associated with a second site of the subscriber, the transport network communicating in accordance with a second protocol;

the SMS provisioning a second interface of the second service processing switch, said second interface configured to communicate data in accordance with the first protocol;

the SMS creating a first-protocol-over-second-protocol (FPoSP) Virtual Private Network (VPN) including a first virtual router (VR) corresponding to the first interface and a second VR corresponding to the second interface;

the SMS provisioning a private virtual circuit (PVC) between the first service processing switch and the second service processing switch with the transport network; and the first service processing switch and the second service processing switch securely communicating data between the first site and the second site via the PVC by encapsulating header and payload information of the first protocol within protocol data units (PDUs) of the second protocol and encrypting and authenticating PDUs exchanged between the first service processing switch and the second service processing switch.

2. The computerized method of claim 1, wherein the first protocol comprises a frame relay protocol.

3. The computerized method of claim 1, wherein the second protocol comprises a Transmission Control Protocol/Internet Protocol (TCP/IP) protocol.

4. The computerized method of claim 1, wherein the second protocol comprises an Internet Protocol Security (IPSec) protocol.

5. The computerized method of claim 1, wherein the first protocol comprises an Asynchronous Transfer Mode (ATM) protocol.

6. The computerized method of claim 1, wherein said provisioning a transport network utilizes the parameters from the predetermined policy definition.

7. The computerized method of claim 1, wherein said provisioning a PVC utilizes the parameters from the predetermined policy definition.

8. The computerized method of claim 1, wherein said provisioning a second interface utilizes the parameters from the predetermined policy definition.

9. A service processing system comprising:
  a first service processing switch including a plurality of processing elements;
  a second service processing switch including a plurality of processing elements;
  a service management system (SMS), operable to automatically configure and control operation of service processing switches, of a service provider communicably coupled to the first service processing switch and the second service processing switch and operable to:
    read a predetermined policy definition from a computer-readable media;
    provision a first interface of the first service processing switch, the first interface associated with a first site of a subscriber of the service provider, said provisioning using parameters provided from the predetermined policy definition, said first interface configured to communicate data in accordance with a first protocol, the parameters including a window size, a window timeout, a number of allowed bad events, an event window size and a keep-alive interval;
    provision a second interface of the second service processing switch, the second interface associated with a second site of the subscriber, said second interface configured to communicate data in accordance with the first protocol;
    create a first-protocol-over-second-protocol (FPoSP) Virtual Private Network (VPN) including a first virtual router (VR) corresponding to the first interface and a second VR corresponding to the second interface;
    provision a private virtual circuit (PVC) between the first service processing switch and the second service processing switch with a transport network communicating in accordance with a second protocol; and
  wherein the first service processing switch and the second service processing switch securely communicate data between the first site and the second site via the PVC by encapsulating header and payload information of the first protocol within protocol data units (PDUs) of the second protocol and encrypting and authenticating PDUs exchanged between the first service processing switch and the second service processing switch.

10. The service processing system of claim 9, wherein the first protocol comprises a frame relay protocol.

11. The service processing system of claim 9, wherein the second protocol comprises a Transmission Control Protocol/Internet Protocol (TCP/IP) protocol.

12. The service processing system of claim 9, wherein the second protocol comprises an Internet Protocol Security (IPSec) protocol.

13. The service processing system of claim 9, wherein the first protocol comprises an Asynchronous Transfer Mode (ATM) protocol.

14. The service processing system of claim 9, wherein provisioning the transport network utilizes the parameters from the predetermined policy definition.

15. The service processing system of claim 9, wherein provisioning the PVC utilizes the parameters from the predetermined policy definition.

16. The service processing system of claim 9, wherein provisioning the second interface utilizes the parameters from the predetermined policy definition.

17. A method for managing interworking protocols comprising the following computer-implemented steps:
  responsive to receiving information regarding desired service parameters, including a window size, a window timeout, a number of allowed bad events, an event window size and a keep-alive interval from a predetermined policy definition, a service management system (SMS) of a service provider, which is operable to automatically configure and control operation of service processing switches, establishing a dedicated first-protocol-over-second-protocol (FPoSP) Virtual Private Network (VPN) for a subscriber of a plurality of subscribers of the service provider by
    programmatically establishing a first FPoSP virtual router (VR) on a first service processing switch residing within a first point of presence (POP) of a plurality of POPs of the service provider, the first VR associated with a first physical site of a plurality of physical sites of the subscriber, and configured to facilitate communication of data among the first physical site and other of the plurality of physical sites, wherein the first physical site and the first service processing switch exchange data in accordance with the first protocol,
    programmatically establishing a second FPoSP VR on second service processing switch residing within a second POP of the plurality of POPs, the second VR associated with a second physical site of the plurality of physical sites and configured to facilitate communication of data among the second physical site and other of the plurality of physical sites, wherein the second physical site and the second service processing switch exchange data in accordance with the first protocol
    programmatically establishing a third FPoSP VR on third service processing switch residing within a third POP of the plurality of POPs, the third VR associated with a third physical site of the plurality of physical sites and configured to facilitate communication of data among the third physical site and other of the plurality of physical sites, wherein the third physical site and the third service processing switch exchange data in accordance with the first protocol, programmatically forming connections between each of the first VR, the second VR and the third VR via a plurality of secure tunnels, and programmatically creating a transport between each of the first VR, the second VR and the third VR via a transport network interconnecting the first, second and third service processing switches via the second protocol; and establishing a Private Virtual Circuit (PVC) between the first service processing switch and the second service processing switch based on the service parameters, whereby a FPoSP connection is formed between the first service processing switch and the second service processing switch to enable secure FPoSP communications between the first physical site and the second physical site.

18. The method of claim 17, wherein the first protocol comprises a frame relay protocol.

19. The method of claim 17, wherein the second protocol comprises a Transmission Control Protocol/Internet Protocol (TCP/IP) protocol.

20. The method of claim 17, wherein the second protocol comprises an Internet Protocol Security (IPSec) protocol.

21. The method of claim 17, wherein the first protocol comprises an Asynchronous Transfer Mode (ATM) protocol.

22. A computer-readable storage medium having stored thereon instructions, which when executed by one or more processors of a service management system (SMS) of a service provider that is operable to automatically configure and control operation of service processing switches, cause a method to be performed comprising the following computer-implemented steps:

responsive to receiving information regarding desired service parameters, including a window size, a window timeout, a number of allowed bad events, an event window size and a keep-alive interval from a predetermined policy definition, a service management system (SMS) of a service provider establishing a dedicated first-protocol-over-second-protocol (FPoSP) Virtual Private Network (VPN) for a subscriber of a plurality of subscribers of the service provider by programmatically establishing a first FPoSP virtual router (VR) on a first service processing switch residing within a first point of presence (POP) of a plurality of POPs of the service provider, the first VR associated with a first physical site of a plurality of physical sites of the subscriber, and configured to facilitate communication of data among the first physical site and other of the plurality of physical sites, wherein the first physical site and the first service processing switch exchange data in accordance with the first protocol, programmatically establishing a second FPoSP VR on second service processing switch residing within a second POP of the plurality of POPs, the second VR associated with a second physical site of the plurality of physical sites and configured to facilitate communication of data among the second physical site and other of the plurality of physical sites, wherein the second physical site and the second service processing switch exchange data in accordance with the first protocol programmatically establishing a third FPoSP VR on third service processing switch residing within a third POP of the plurality of POPs, the third VR associated with a third physical site of the plurality of physical sites and configured to facilitate communication of data among the third physical site and other of the plurality of physical sites, wherein the third physical site and the third service processing switch exchange data in accordance with the first protocol, programmatically forming connections between each of the first VR, the second VR and the third VR via a plurality of secure tunnels, and programmatically creating a transport between each of the first VR, the second VR and the third VR via a transport network interconnecting the first, second and third service processing switches via the second protocol; and establishing a Private Virtual Circuit (PVC) between the first service processing switch and the second service processing switch based on the service parameters, whereby a FPoSP connection is formed between the first service processing switch and the second service processing switch to enable secure FPoSP communications between the first physical site and the second physical site.

23. The computer-readable storage medium of claim 22, wherein the first protocol comprises a frame relay protocol.

24. The computer-readable storage medium of claim 22, wherein the second protocol comprises a Transmission Control Protocol/Internet Protocol (TCP/IP) protocol.

25. The computer-readable storage medium of claim 22, wherein the second protocol comprises an Internet Protocol Security (IPSec) protocol.

26. The computer-readable storage medium of claim 22, wherein the first protocol comprises an Asynchronous Transfer Mode (ATM) protocol.

27. A service processing system comprising:

a first service processing means and a second service processing means, each including a plurality of processing elements for securely communicating data between a first site of a subscriber of a service provider and a second site of the subscriber; and a service management system (SMS), operable to automatically configure and control operation of service processing means communicably coupled to the first service processing means and the second service processing means for reading a predetermined policy definition from a computer-readable media;

provisioning a first interface of the first service processing means, the first interface associated with the first site, said provisioning using parameters provided from the predetermined policy definition, said first interface configured to communicate data in accordance with a first protocol, the parameters including a window size, a window timeout, a number of allowed bad events, an event window size and a keep-alive interval;

provisioning a second interface of the second service processing means, the second interface associated with the second site, said second interface configured to communicate data in accordance with the first protocol;

creating a first-protocol-over-second-protocol (FPoSP) Virtual Private Network (VPN) including a first virtual router (VR) corresponding to the first interface and a second VR corresponding to the second interface;

provisioning a private virtual circuit (PVC) between the first service processing means and the second service processing means with a transport network communicating in accordance with a second protocol; and wherein the first service processing means and the second service processing means securely communicate data between the first site and the second site via the PVC by encapsulating header and payload information of the first protocol within protocol data units (PDUs) of the second protocol and encrypting and authenticating PDUs exchanged between the first service processing means and the second service processing means.

28. The service processing system of claim 27, wherein the first protocol comprises a frame relay protocol.

29. The service processing system of claim 27, wherein the second protocol comprises a Transmission Control Protocol/Internet Protocol (TCP/IP) protocol.

30. The service processing system of claim 27, wherein the second protocol comprises an Internet Protocol Security (IPSec) protocol.

31. The service processing system of claim 27, wherein the first protocol comprises an Asynchronous Transfer Mode (ATM) protocol.

32. The service processing system of claim 27, wherein provisioning the transport network utilizes the parameters from the predetermined policy definition.

33. The service processing system of claim 27, wherein provisioning the PVC utilizes the parameters from the predetermined policy definition.

34. The service processing system of claim 27, wherein provisioning the second interface utilizes the parameters from the predetermined policy definition.

35. A computer-readable storage medium having tangibly embodied thereon instructions, which when executed by one or more processors of a service management system (SMS) of a service provider that is automatically operable to configure and control operation of service processing switches, cause a method to be performed comprising the following computer-implemented steps:

reading a predetermined policy definition;

provisioning a first interface of a first service processing switch of a plurality of service processing switches with which the SMS is communicatively coupled, the first interface associated with a first site of a subscriber of the service provider based upon parameters provided from the predetermined policy definition, said interface configured to communicate data in accordance with a first protocol, the parameters including a window size, a window timeout, a number of allowed bad events, an event window size and a keep-alive interval;

provisioning a transport network to provide a transport between the first interface and a second interface of a second service processing switch associated with a second site of the subscriber, the transport network communicating in accordance with a second protocol;

provisioning a second interface of the second service processing switch, said second interface configured to communicate data in accordance with the first protocol;

creating a first-protocol-over-second-protocol (FPoSP) Virtual Private Network (VPN) including a first virtual router (VR) corresponding to the first interface and a second VR corresponding to the second interface;

provisioning a private virtual circuit (PVC) between the first service processing switch and the second service processing switch with the transport network; and causing the first service processing switch and the second service processing switch to securely communicate data between the first site and the second site via the PVC by encapsulating header and payload information of the first protocol within protocol data units (PDUs) of the second protocol and encrypting and authenticating PDUs exchanged between the first service processing switch and the second service processing switch.

36. The computer-readable storage medium of claim 35, wherein the first protocol comprises a frame relay protocol.

37. The computer-readable storage medium of claim 35, wherein the second protocol comprises a Transmission Control Protocol/Internet Protocol (TCP/IP) protocol.

38. The computer-readable storage medium of claim 35, wherein the second protocol comprises an Internet Protocol Security (IPSec) protocol.

39. The computer-readable storage medium of claim 35, wherein the first protocol comprises an Asynchronous Transfer Mode (ATM) protocol.

40. The computer-readable storage medium of claim 35, wherein said provisioning a transport network utilizes the parameters from the predetermined policy definition.

41. The computer-readable storage medium of claim 35, wherein said provisioning a PVC utilizes the parameters from the predetermined policy definition.

42. The computer-readable storage medium of claim 35, wherein said provisioning a second interface utilizes the parameters from the predetermined policy definition.

* * * * *